United States Patent

[11] 3,604,777

[72] Inventors Einar S. Mathisen
Poughkeepsie;
Leonard S. Sheiner, Wappingers Falls, both of, N.Y.
[21] Appl. No. 868,146
[22] Filed Oct. 21, 1969
[45] Patented Sept. 14, 1971
[73] Assignee International Business Machines Corporation
Armonk, N.Y.

[54] RETURN BEAM HOLOGRAPHY
13 Claims, 7 Drawing Figs.
[52] U.S. Cl. .................................................. 350/3.5
[51] Int. Cl. ............................................ G02b 27/22
[50] Field of Search............................................ 350/3.5

[56] References Cited
UNITED STATES PATENTS
3,514,176  5/1970  Brooks et al................. 350/3.5

OTHER REFERENCES
Denisyuk, Optics & Spectroscopy, Vol. 15, No. 4, pp. 279–284 (10/1968).
Casler et al., Applied Physics Letters, Vol. 10, No. 12, pp. 341–342 (6/1967).
Brandt, " Image Plane Holography" 8 Applied Optics 1421–1429 (7/1969) 350-3.5

*Primary Examiner*—David Schonberg
*Assistant Examiner*—Robert L. Sherman
*Attorneys*—Hanifin and Jancin and Melvyn D. Silver ABSTRACT: Method and apparatus for constructing and reconstructing a hologram, whereby the hologram is reconstructed upon the original image plane used in constructing the hologram, by use, in one embodiment, of a spherical mirror placed to reflect divergent light originally passing through the hologram, back through the hologram as convergent light. Included are liquid gate means for reducing reflection glare from the hologram onto the reconstructed image.

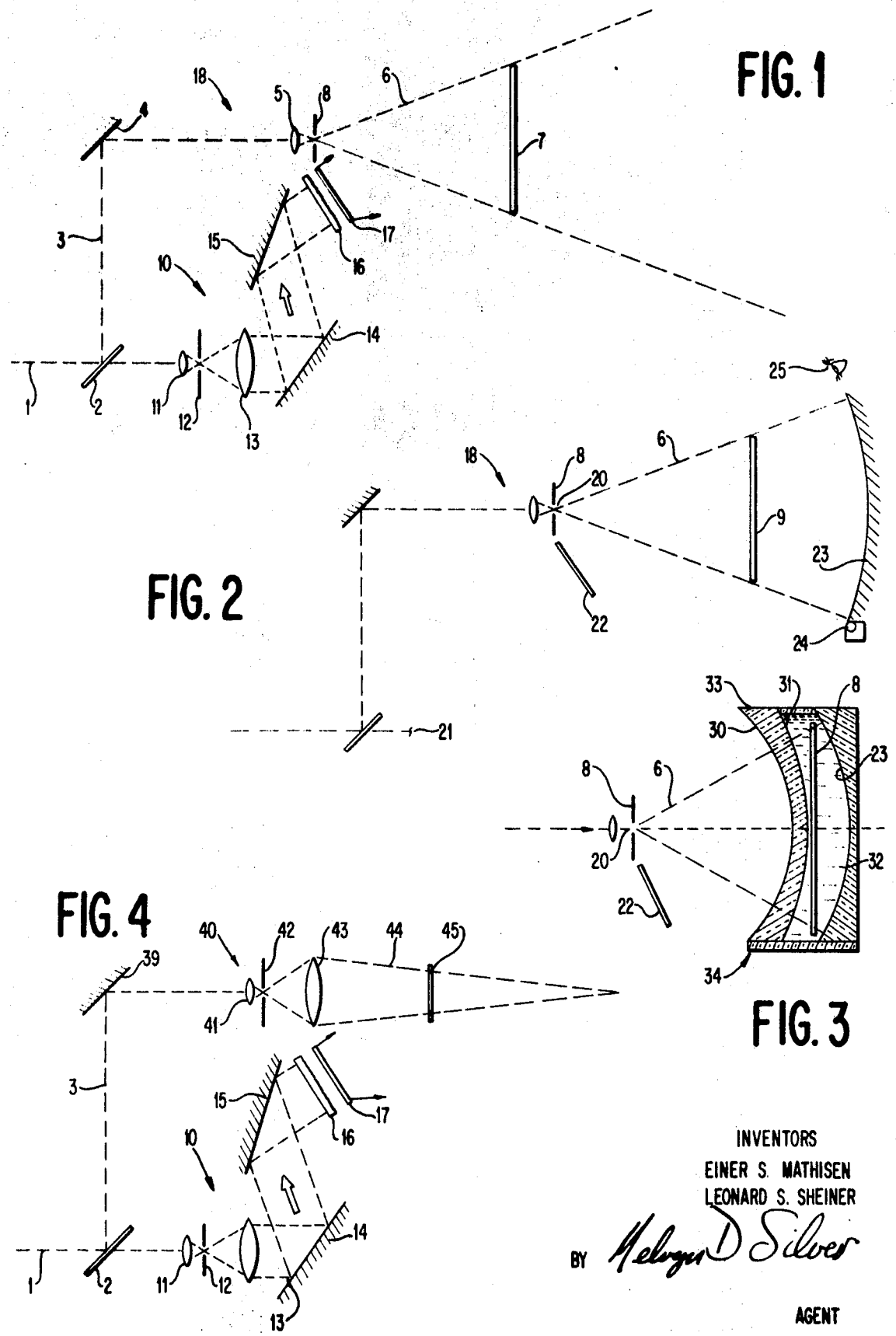

PATENTED SEP 14 1971

RETURN BEAM HOLOGRAPHY

FIELD OF THE INVENTION

Method and apparatus for the construction and reconstruction of holograms. Included are the necessary lens systems and apparatus for reconstructing the hologram upon its original image plane in original size and orientation.

BACKGROUND OF THE INVENTION

Hologram optics, first described by Gabor in 1948, have become practical only with the advent of the laser, which provides the intense, phase-coherent source needed to easily record and view holograms. The unique properties of holograms stem from the fact that they record both phase and amplitude. This eliminates the need to record focused images. Lenses are not strictly necessary either for recording or viewing. The reconstructed wave front proceeds onward from the hologram as if it emanated from the original reflecting object.

Each area of a hologram taken by diffused transmission or diffused reflection, however small, contains information of the entire scene. Any part of the hologram can be illustrated to reconstruct the entire original scene. However, resolution of the reconstructed image is degraded as the area of the illuminated hologram is decreased. But since the information is distributed equally over the entire recording area, holograms are relatively insensitive to breakage, scratching, and dust particles.

Thus, the basic properties of holograms would appear to lend themselves to microcircuit manufacturing applications, particularly where photosensitive resists are used as a step in the manufacturing process of microcircuit elements. Current glass masks used with conventional optical systems in the photoresist step in the manufacture of microcircuit elements have basic inherent defects. A current technique is to expose a photoresisted area on a microcircuit element such as a semiconductor wafer, through a glass mask, which is in contact with the photoresist surface. This leads to excessive wear and degradation of the glass mask pattern. Further, whether the mask be metal, or a photographic plate or a photographic film, the continuous handling of the mask tends to degrade the image recorded in the film, glass, or metal mask. Should a part of the image on the mask be injured, that information is irretrievably lost.

While holograms have the advantage of retaining all information upon every part of the hologram, a practical manufacturing technique is required to successfully use holographic techniques to expose photoresist surfaces. Preferably, these techniques should allow the hologram to be made from the highly accurate master mask, and allow the reconstructed hologram to be focused onto the photosensitive surface in exactly the same size and alignment as the original master mask. Further, any such "noncontact" exposure should avoid glare or fogging effects, which will affect resolution of the photosensitive surface being exposed on, for example, a microcircuit element. Since a great number of microcircuit elements must be serially exposed to allow an economic manufacturing system, the alignment means for the microcircuit element must be sure and simple.

Prior holographic systems have often utilized an excessive number of lenses, or a complex alignment means, none of which lend themselves toward economic utilization of holographic effects toward the microcircuit electronic industry.

Thus, an ideal system would be one allowing the construction of a hologram in the same apparatus in which the reconstruction of the hologram will occur. If the reconstruction of the hologram, in turn, can be made to occur directly on the object plane from which the hologram was initially constructed, then size and alignment problems are inherently overcome.

SUMMARY OF THE INVENTION

Thus, an object of this invention is to allow high resolution holographic reconstruction on the original image plane used to make the original hologram.

A further object is to allow such reconstruction without the use of expensive lens systems.

Another object is to eliminate glare from the hologram from interfering with the reconstructed image.

Another object is to provide a holographic reconstruction system useful in microelectronic circuit manufacture.

These and other objects are met by the holographic construction and reconstruction system of this invention. Briefly stated, in one embodiment, reconstruction of a hologram on the original object plane from which the hologram was constructed is achieved by placing the hologram in the original position occupied by a photographic plate from which the hologram is made; illuminating the hologram with a diverging reference beam identical to the original reference beam from which the hologram was made; and placing a spherical mirror behind the hologram to reflect the diverging beam passing through the hologram back through the hologram as a converging beam. The spherical mirror has the property of and is so aligned such that the radius of curvature of the mirror is coincident with the origin point of the diverging beam.

In another embodiment, glare caused by reflection from the front surface of the hologram that may interfere with or affect the resolution of the reconstructed image is eliminated by use of a liquid gate between the origin point of the diverging beam and the hologram itself.

These, and other embodiments utilizing plane and convex spherical mirrors, will best be understood when read in conjunction with the following drawings and general description.

IN THE DRAWINGS

FIG. 1 shows a schematic of the apparatus for the construction of a hologram, utilizing a divergent reference beam.

FIG. 2 shows a schematic of the apparatus of FIG. 1, adapted for the reconstruction of the hologram constructed by the apparatus of FIG. 1.

FIG. 3 shows an embodiment of a liquid gate to eliminate glare in reconstructing a hologram by the apparatus of FIG. 2.

FIG. 4 shows a schematic of the apparatus for the construction of a hologram utilizing a convergent reference beam.

GENERAL DESCRIPTION

Figure 5:
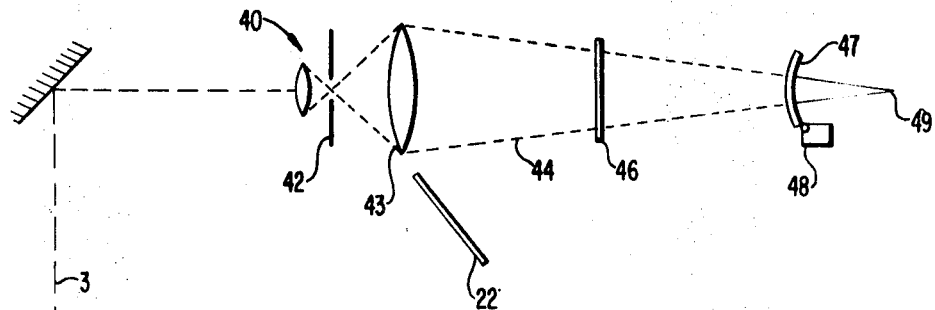
FIG. 5 shows a schematic of the apparatus of FIG. 4, adapted for the reconstruction of the hologram constructed by the apparatus of FIG. 4.

FIGS. 1 and 2 show the preferred embodiment of this invention.

FIG. 1 is a schematic showing the construction mode of the holographic construction-reconstruction apparatus of this invention. FIG. 2 shows the reconstruction mode.

The hologram of an object, such as the master mask for integrated circuit manufacturing processes, is constructed by the method and with the apparatus as shown in FIG. 1. An incoming light beam 1 is divided into two parts by beam splitter 2. The reference portion 3 of the beam enters a first focusing means 18, where it is reflected by mirror 4 to lens 5, which acts as a means for creating a divergent reference beam 6. Located within reference beam 6 is a photographic plate 7, held in position by a photographic-holographic holding means, not shown. A pinhole 8 is utilized, as multiple reflections and aberrations of the optical components can give rise to nonuniform wave fronts, which can severely degrade the quality of the resultant hologram. As both the reference beam and the illuminating beams are often made divergent by passing them through microscope objectives or lenses, a 5-10 micron pinhole, for example, at the focal plane of the objective lenses 5 and 11 eliminates most of the effect caused by multiple reflections and poor quality in the preceding optics. Placing the pinhole as close as possible to the output end of the optical system eliminates distortions imposed by preceding beam splitters and lenses.

The other half of the incoming beam enters a second focusing means generally shown as 10. This system comprises a lens 11, pin hole 12 serving the same function as pinhole 8, lens 13, mirror 14, and mirror 15. The incoming light passes through the system as shown in the figure. A diffuser 16 is placed just before the object 17 from which the hologram is to be made, in this case, a master mask. The object 17 is located in place by an object hold means, which may be any means for holding the object in place while not interfering with the image on the plate. A common photographic plate holder will often be sufficient, as would an X-Y alignment table.

A diffused beam of light emanating from the master mask will impinge upon photographic plate 7, completing the holographic exposure. Upon development of the photographic plate 7, the image formed is the hologram, which is used in reconstruction.

The 6,328A helium-neon laser or any of the other commonly used means for creating monochromatic coherent light may be used as a light source. The indicated helium-neon laser is readily available, stable, and easy to operate. The type of lasers useful in the making of holograms is further discussed in "How to Make Laser Holograms," by K. S. Pennington, Microwaves, Oct. 1965, page 35. The wavelength of the light used should, of course, be suitable for later photoresist or photosensitive material exposure.

Kodak 649F Spectroscopic plates are most commonly used in the manufacture of holograms. The manufacturer specifies the resolution of more than 2,000 lines per millimeter. This emulsion can record the interference patterns between, for example, two 6,328A waves from a helium-neon laser, at a wide range of angles of interference. Thus, these plates are extremely versatile.

While the second focusing means 10 has been described as shown in the figure, it is evident to one skilled in the art that other means may be utilized. It is, of course, important that the object 17 be outside of the diverging reference beam 6. Similarly, the mirror 4, lens 5, and pinhole 8, may generally be delineated as a first focusing means 18, as other means are available to one skilled in the art.

Thus, utilizing the apparatus of FIG. 1, in the mode shown, a hologram is made from a diverging reference beam and diffused object beam. Reconstruction of the hologram, now designated by the numeral 9 to distinguish it from the undeveloped hologram (exposed photograph plate) 7, is shown in FIG. 2.

FIG. 2 maintains the same first focusing means 18 as shown in FIG. 1. The divergent reference beam 6 used for reconstructing the hologram is the same as the original divergent reference beam used in constructing the hologram. The origin point of the diverging beam will be designated at 20, at which position the pin hole 8 is placed. An intercept means is placed at the position 21, for the purpose of blocking out that part of the system comprising the second focusing means, shown in FIG. 1. This intercept means may be a deflecting mirror, an absorbing material, or any means to prevent light from entering the initial second focusing means 10. On the alternative, second focusing means 10 may be swung out of the system entirely. The original master mask holding means used for holding object 17 is now replaced with an object holding means 22, upon which reconstructed holograms will be focused. The object holding means may be a conveyor assembly with alignment means, or other means, including a photographic plate holder, for example. Also included would be state of the art wafer-holding means, such as vacuum means. This object holding means 22 can be designed to accept integrated circuit wafer having a photoresist covering, for the purposes of exposure to the reconstructed hologram.

A key element in the system is concave spherical mirror 23, which can be moved into position by a mirror interposing means, such as the holding and aligning means 24. An essential requirement of both the mirror, and the mirror interposing means which will align the mirror, is that the mirror be positioned such that the radius of curvature of spherical mirror 23 is coincident with the origin 20 of the diverging beam of light 6.

Thus, in operating in reconstruction mode, diverging light passing through hologram 9 will be reflected from mirror 23 as converging light back through the hologram 9, to be reconstructed in focus on object-holding means 22, which is coincident with the original object plane 17 from which the hologram 9 was made. A viewer positioned as shown at 25 will be able to see the virtual image of the hologram. Thus, the conjugate reconstruction or read out beam has been made without altering the original reference beam apparatus used for constructing the hologram. The spherical mirror 23, is adjusted such that the original reference beam 6 is reflected by the spherical mirror, forming the image of the pin hole 8 on itself: the center of the radius of the mirror 23 coincides with the pinhole. When placing the hologram 9 in the exact same position in which the hologram was constructed, as shown in FIG. 1, and using the original diverging reference beam 6, the DC term will pass through the hologram 9 and be reflected by the spherical mirror 23. Because of the position of the spherical mirror 23 relative to the pinhole 20, the diverging beam will be returned along its original path and when passing through the hologram 9 act as a converging reconstruction beam forming a real image at the original object plane 17. The incoming diverging beam 6 diffracted by the hologram 9 will form the virtual image.

Thus, in sum, by use of interposing means 21, the second focusing means is eliminated from the system; object holding means 22 replaces master mask holding means 17; and spherical mirror 23 is interposed into the diverging beam by mirror interposer means, while the photographic plate 7 is replaced by the developed hologram 9. This system thus inherently assures that the original master plate will be faithfully reproduced in its original size and position, for a great ease of exposure of photoresist upon integrated circuit chips, as one application. The system utilizes a minimum of lenses, none of which are expensive as their size is small. Small, inexpensive, quality lenses are readily available. The mirrors utilized are also readily available, as is the beam splitter. The individual components are well known in the art.

As mentioned previously, it is desirable to eliminate as much glare or fogging from interfering with the reconstructed image that will appear at 22 in FIG. 2. A certain amount of glare, by reflection from the front surface of the hologram, will occur from the diverging beam 6 striking the glass plate hologram 9. While other holographic materials may be used other than glass, such as photographic film, nonetheless a certain amount of glare will be present. This glare can be eliminated by the use of the system shown in FIG. 3. As shown in the figure, a liquid gate means is used such that the reconstruction beam reflection on its first pass to the hologram returns along its original path to the origin of the reference beam, thereby not interfering with the real image projection. This is done as follows. The original diverging reference beam 6, used for reconstructing the hologram 9 onto the image plane 17, passes through a spherical transparent surface 30, whose front surface has the property of and is so aligned that its radius of curvature is coincident with the origin point 20. The second surface 31 may be of any shape. The spherical front surface mirror 23 is, as before, placed at a distance from the origin point 20 and is so aligned so its center of curvature radius also coincides with the pinhole 8 for origin point 20. The space between the mirror 23 and the rear surface 31 of the spherical transparent surface is suitably sealed and filled with a liquid 32 whose index of refraction is chosen to match that of the material 33 constituting the spherical transparent surface. The hologram 9, as before, is inserted in a position such that it duplicates its original position as shown in FIG. 1.

Briefly stated then, the method of reconstructing the hologram onto the original object plane from which the hologram was constructed comprises the steps of placing the hologram in the exact original position occupied by the photosensitive surface which upon development became the hologram; illuminating the front face of the hologram with a diverging reference beam identical to the original diverging reference beam used in exposing the photosensitive surface which upon development became the hologram; and finally, placing a spherical mirror opposite the backface of the hologram to reflect the diverging reference beam passing through the hologram back through the hologram as a converging beam, where the spherical mirror has the property of and is so aligned such that the radius of curvature of the spherical mirror is coincident with the origin point 20 of the diverging reference beam. Of course, to eliminate the glare, an additional step can be utilized, that of placing a liquid gate between the light source and the hologram. This is done by placing a spherical transparent surface between the hologram and the diverging beam of light, where the spherical transparent surface has the property of and is aligned with the diverging beam of light such that the radius of curvature of that side 30 of the spherical transparent surface nearest the diverging beam of light, the front face, is coincident with the origin 20 of the diverging beam of light, and the spherical transparent surface being of a size sufficient to intercept that area of light that passes through the hologram. Of course, it is necessary that the space between the rear surface 31 of the spherical transparent surface, and the front surface of the spherical mirror 23 be filled with a medium having the same index of refraction as the spherical transparent surface.

The apparatus in practicing this method is simple to construct. Starting with a basic reference frame, which can be a flat surface, a vertical surface, or literally any "black box," it is only necessary that a beam splitting means and a first focusing means be located along the frame causing the incoming reference beam to become a diverging reference beam; a means be provided for holding the spherical mirror in the desired place, discussed previously, and that hologram aligning means be located, which means is coincident with the position of the initial photographic plate. More generally, of course, if it is not essential that the hologram be reconstructed onto its original object plane, the requirement that the hologram be positioned in the original position from which the hologram was made is not necessary. A standard photographic plate or film holder may be utilized as the holographic-photographic holding means. Of course, for the complete apparatus as shown in FIGS. 1 and 2, beam-splitting means may be attached to the frame, interposing means may be utilized to eliminate the second focusing system, and may be attached to the frame. Second focusing means may be similarly attached to the frame, as may also be the mirror interposing means and the real image view means.

While the above describes the preferred embodiment of this invention, in that expensive lenses of large numerical aperture are not needed in the reconstruction mode, the basic idea of reconstructing the hologram on the original object plane from which the hologram was constructed may be implemented by two other means. Both of these means have the disadvantage, compared to the preferred embodiment, of requiring quality lenses. However, for various applications, this may not be important, or it may even be desirable to use either of the two systems disclosed below.

FIG. 4 shows an embodiment of this invention, utilizing a convergent reference beam in the construction mode of the hologram. The second focusing means, generally delineated by the numeral 10, is as described in conjunction with the preferred embodiment of FIG. 1, and will not be further described. The reference numerals are the same as in FIG. 1. The reference beam 3 from the beam splitter 2 enters the first focusing means for this embodiment, generally designated by the numeral 40. As shown, this essentially comprises mirror 39, lens 41, pinhole means 42, and converging lens 43. The incoming light enters the first focusing means and via the lenses emerges as a converging beam 44 to pass through the photographic plate 45. In conjunction with the diffused beam from the second focusing means 10, via diffuser 16 through the object or master mask 17, the photographic plate 45 is exposed. Upon development, photographic plate 45 becomes the hologram 46 as shown in FIG. 5. In FIG. 5, interposing means described previously is utilized to block out the second focusing means 10 from the system. Object-holding means is interposed in place of the original object 17, as described previously. First focusing means 40 remains as before, shown in FIG. 4. The hologram 46 is interposed in the converging beam 44, in the exact position occupied by the photographic plate which upon development became the hologram. Front face reflecting convex spherical mirror 47 is now placed, for the reconstruction mode, in the converging beam behind the backface of the hologram 46. Convex spherical mirror 47 is so aligned, by aligning means 48, and has the property of having a radius of curvature coincident with the focal point 49 of the lens 43. When aligned in this manner, convex spherical mirror 47 will reflect the converging beam 44 back upon itself, resulting in the hologram 46 being reconstructed upon the object holding means 22. Thus, again, converging beam 44 via lens 43 is refocused on the pinhole 42, as with the preferred system of FIGS. 1 and 2.

Figure 6:
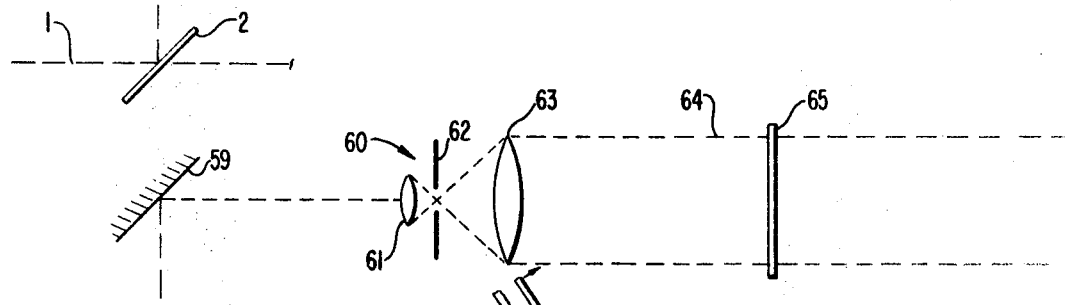
FIG. 6 shows a schematic of the apparatus of the construction of the hologram utilizing a parallel reference beam.
Figure 7:
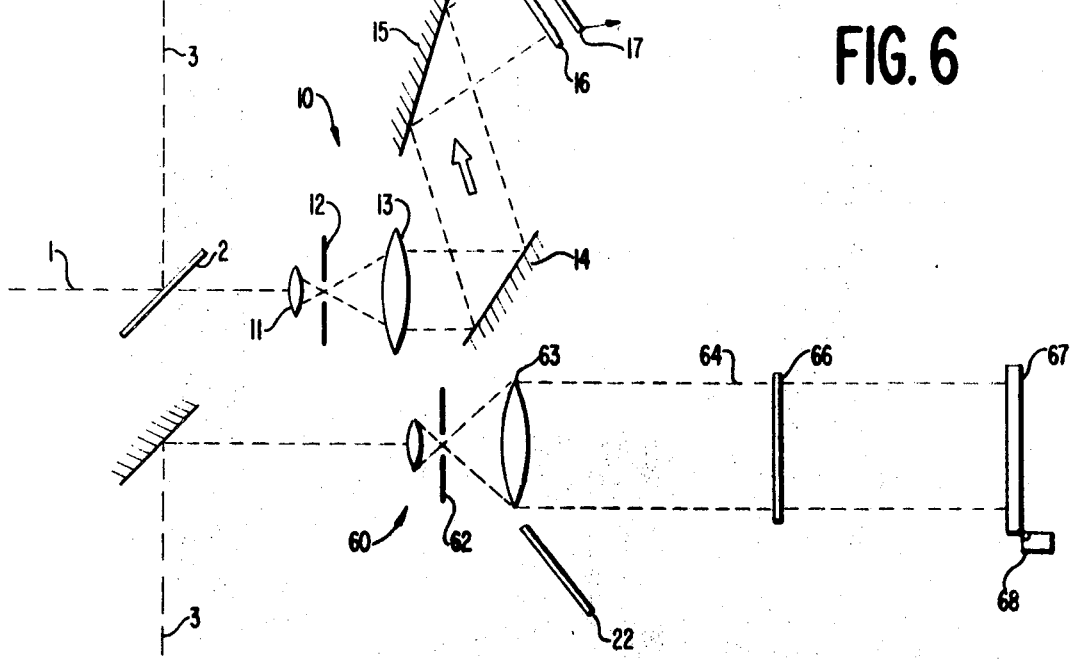
FIG. 7 shows a schematic of the apparatus of FIG. 6, adapted for the reconstruction of the hologram constructed by the apparatus of FIG. 6.

FIG. 6 shows an apparatus for the construction of a hologram utilizing the second focusing means 10 as described in conjunction with the prior embodiments. First focusing means 60 here comprises mirror 59, lens 61, pinhole 62, and lens 63 to create a parallel beam 64 to impinge upon the photographic plate 65. The photographic plate 65, exposed to the parallel reference beam 64 and the beam emerging from the object or master mask 17 via the diffuser 16, will interact to expose the photographic plate. Photographic plate 65, which upon development becomes hologram 66, as shown in FIG. 7, is relocated in the exact position which it occupied when the hologram was exposed. Second focusing means 10 is eliminated from the system as discussed in conjunction with FIG. 2. The object 17 is replaced with object holding means 2. First focusing means 60 remains as it was for the construction mode. However, plane mirror 67 is now aligned in the reference beam 64, to reflect the beam directly back upon itself, and thus, via lens 63, refocused back upon the pinhole 62. In this manner, the reference beam 64 passing through the hologram 66 will be reflected back upon itself by plane mirror 67, whereby the hologram will be reconstructed upon the original object plane, represented by the real image view means 22.

Mirror 67 may be pivotally mounted to be swung into position by plane mirror holding means 68. It is, of course, essential that the mirror 67 be so aligned as to be normal to the incident beam 64, so as to reflect it back upon itself.

From the various embodiments shown, it is evident that the key requirements for reconstructing the hologram back upon the original object plane from which it was created, is that the original reference beam must be utilized, or recreated for the reconstruction mode, and must be reflected back upon itself and thus through the hologram, which is positioned in the same position as the photographic plate from which the hologram upon development was formed. Broadly stated, the reference beam must be reflected back upon itself, or when the pinhole is used, back upon the pinhole, thereby creating a true conjugate beam. This assures the reconstruction upon the original object plane.

The embodiments of FIG. 4 and 6 both utilize large lenses 43 and 63. As stated previously, however, this may now be exceptionally disadvantageous for certain applications. The preferred embodiment, however, is that shown in FIGS. 1 and 2.

As with the apparatus described in FIGS. 1 and 2, the apparatus of FIGS. 4, 5, 6, 7, is easily constructed using known methods and known equipment. Thus, various hinge means are available for interposing the blocking means for second focusing system 10 or to move the system physically out of the way of the reconstruction mode. Hinge means and other alignment means are available for interposing the necessary mirrors during reconstruction, and this interposing means can be coupled with alignment means to adjust and position the object-holding means 22. In this manner, the mirror and object-holding means operate together, while concurrently eliminating from the system the second focusing means 10. These systems may be easily built in any convenient reference frame. As with the embodiment of FIG. 2, the glare elimination apparatus may be utilized to eliminate glare in the reconstruction system of FIGS. 5 and 7.

Thus, the objects of this invention have been met by the method and apparatus disclosed. High-resolution holographic reconstruction can be made to occur in the original image plane used in making the original hologram. Inexpensive lens systems may be utilized, and glare may be eliminated from the hologram. This holographic reconstruction system may be used in the manufacture of microelectronic circuit devices, and has the great advantages of never being damaged by contact with the photoresisted surfaces, minimal handling, and the great inherent advantage that should any part of the hologram be destroyed, the balance of the hologram nonetheless contains all the information contained on the entire hologram in its undestroyed state. The physical removal of the "master," now being the hologram, from the image plane allows very rapid interchanging of parts to be exposed, in the photoresist process.

The glare removal system also disclosed by requiring only that the liquid have the same refractive index as the glass or material used for the spherical transparent surface, allows a great variety of materials to be used. One material which has given good results is the liquid decahydronapthalene, in conjunction with optical glass used for the spherical transparent surface. Other materials may also be utilized.

While particular embodiments have been shown, other uses and variations of that disclosed will be evident to those skilled in the art, without departing from the spirit and scope of this invention.

What is claimed is:

1. A method of reconstructing a holographic image comprising:
    illuminating the front face of a hologram constructed with a first diverging reference beam with a second diverging reference beam;
    placing a spherical mirror opposite the backface of said hologram, said spherical mirror having the property of being aligned with said second diverging beam of light such that the radius of curvature of said spherical mirror is coincident with the origin of said second diverging beam of light;
    whereby diverging light passing through said hologram is reflected back from said spherical mirror as a converging beam back through said hologram, reconstructing the image from which said hologram was constructed.

2. A method of reconstructing a glare-free holographic image comprising:
    illuminating the front face of a hologram constructed with a first diverging reference beam with a second diverging reference beam;
    placing a spherical mirror opposite the backface of said hologram, said spherical mirror having the property of and being aligned with said second diverging beam of light such that the radius of curvature of said spherical mirror is coincident with the origin of said second diverging beam of light;
    placing a liquid gate means between said hologram and the origin of said diverging beam of light, comprising a spherical transparent surface having the property of and being aligned with said diverging beam of light such that the radius of curvature of that side of said spherical transparent surface nearest said origin point of said diverging beam of light is coincident with the origin of said diverging beam of light, said spherical transparent surface being of a size sufficient to intercept that area of light that passes through said hologram;
    filling the space between said spherical transparent surface and said spherical mirror with a medium having the same index of refraction as said spherical transparent surface;
    whereby light reflected from said spherical mirror back through said hologram reconstructs a glare-free real image from which said hologram was constructed.

3. The method of claim 1 wherein said spherical mirror is of a size and is so located as to reflect back through said hologram the entire area of light originally passing through said hologram to said spherical mirror.

4. The method of claim 2 wherein said spherical mirror is of a size and is so located as to reflect back through said hologram the entire area of light originally passing through said hologram to said spherical mirror.

5. Apparatus for the reconstruction of a hologram comprising:
    a reference frame;
    first focusing means located along said frame for causing an incoming reference beam to become a diverging reference beam;
    a spherical mirror located along said frame, said spherical mirror having the property of and being aligned with said diverging reference beam such that the radius of curvature of said spherical mirror is coincident with the origin point of said diverging reference beam; and
    hologram-aligning means located along said frame for interposing a hologram between said diverging means and said spherical mirror, to reflect that part of said reference beam passing through the hologram back from said spherical mirror, through the hologram, as a conjugate beam.

6. The apparatus of claim 5 including a liquid gate means located upon said frame between the origin point of said diverging reference beam and said hologram aligning means, comprising a spherical transparent surface having the property of and being aligned with said diverging reference beam such that the radius of curvature of said spherical transparent surface nearest the origin point is coincident with the origin point, said spherical transparent surface being of a size sufficient to intercept that area of light that passes through the hologram, and containing means for containing a medium having the same index of refraction as said spherical transparent surface, located between and contacting at least said spherical transparent surface and said spherical mirror such that said spherical transparent surface and said spherical mirror comprise at least two of the containing walls of said containing means.

7. The apparatus of claim 6 wherein a medium of the same index of refraction as said spherical transparent surface is located within said containing means.

8. The apparatus of claim 5 including object holding means located at the real image plane of the reconstructed hologram for allowing the real image to be reconstructed thereon.

9. Apparatus for the construction and reconstruction of holograms comprising:
    a reference frame;
    a beam-splitting means located upon said frame to split an incoming beam of light to first and second focusing means located upon said frame, said first focusing means comprising means for converting said incoming beam of light to a diverging beam of light capable of illuminating a photographic recording surface located within the diverging beam of light by a photographic-holographic holding means attached to said frame;
    said second focusing means comprising means for illuminating the object to be holographed such that the diverging image of said object is capable of falling upon the photographic recording surface located by said photographic-holographic holding means, the object being located by master mask-holding means attached to said frame, the object plane being located outside of the diverging beam of light created by said first focusing means;

intercept means attached to said frame to intercept and cut off incoming light to said second focusing means;

a spherical mirror attached to mirror interposing means attached to said frame to interpose said spherical mirror at a position after said photographic-holographic holding means relative to the origin of the diverging beam of light, said spherical mirror having the property of and said mirror interposing means so aligned that when said mirror is interposed, its radius of curvature is coincident with the origin of said diverging light; and object-holding means located upon said frame to be interchangeable with said master masking-holding means, to allow a reconstructed hologram from a hologram originally made when said first and second focusing means and a photographic recording surface are utilized, to be reconstructed upon a viewing surface located by said object holding means when the photographic plate is developed into a hologram and positioned in said photographic-holographic holding means, said spherical mirror is interposed, and said intercept means are utilized.

10. The apparatus of claim 9 including liquid gate means, said liquid gate means being interposed into said diverging reference beam when said spherical mirror is interposed into said diverging reference beam.

11. A method of reconstructing a hologram onto the original object plane from which said hologram was constructed, comprising the steps of:

placing said hologram in the original position occupied by the photosensitive surface which upon development became said hologram;

illuminating the front face of said hologram with a diverging reference beam identical to the original diverging reference beam used in exposing the photosensitive surface which upon development became said hologram; and placing a spherical mirror opposite the backface of said hologram to reflect said diverging reference beam passing through said hologram back through said hologram as a converging beam, said spherical mirror having the property of and being aligned such that the radius of curvature of said spherical mirror is coincident with the origin point of said diverging reference beam.

12. A method of reconstructing a hologram onto the original object plane from which said hologram was constructed, comprising the steps of:

placing said hologram in the original position occupied by the photosensitive surface which upon development became said hologram;

illuminating the front face of said hologram with a reference beam identical to the original convergent reference beam used in exposing the photosensitive surface which upon development became said hologram; and placing a convex spherical mirror opposite the backface of said hologram, said mirror having the property of and being so aligned that the radius of curvature of said mirror is coincident with the focal point of said convergent reference beam so to reflect said reference beam back upon itself and thus back through said hologram as a conjugate beam;

whereby said hologram is reconstructed upon the original object plane from which hologram was constructed.

13. A method of reconstructing a holographic image comprising:

illuminating the front face of a hologram constructed with a first convergent reference beam with a second reference beam;

placing a reflecting means opposite the backface of said hologram, wherein said reflecting means is a convex spherical mirror having the property of and being so aligned that the radius of curvature of said mirror is coincident with the focal point of said convergent reference beam so as to reflect said second reference beam back upon itself and thus back through said hologram as a conjugate beam;

whereby said second reference beam is reflected from said reflecting means back through said hologram, reconstructing the image from which said hologram was constructed.